United States Patent [19]

Meisner et al.

[11] 4,348,055
[45] Sep. 7, 1982

[54] SINGLE CABLE ACTUATED TAILGATE

[75] Inventors: David B. Meisner; Dusan M. Vacval, both of Buffalo Grove, Ill.

[73] Assignee: International Harvester Co., Chicago, Ill.

[21] Appl. No.: 146,975

[22] Filed: May 5, 1980

[51] Int. Cl.³ .............................................. B60P 1/26
[52] U.S. Cl. ................................ 298/23 DF; 296/56
[58] Field of Search .............. 298/23 F, 23 D, 23 DF; 296/56

[56] References Cited

U.S. PATENT DOCUMENTS

| 1,843,685 | 2/1932 | Kissinger | 298/23 DF |
| 1,940,025 | 12/1933 | Silva | 298/23 D |
| 2,023,330 | 12/1935 | Linn | 298/23 DF |
| 2,219,256 | 10/1940 | Evangelista | 298/23 DF |
| 2,246,128 | 6/1941 | Fairbanks | 298/23 DF |
| 2,330,614 | 9/1943 | Ochsner | 298/23 DF |
| 2,419,636 | 4/1947 | Foy | 298/23 DF |
| 2,439,585 | 4/1948 | Snow | 298/23 DF |
| 3,917,343 | 11/1975 | Taylor et al. | 298/23 DF |

FOREIGN PATENT DOCUMENTS

| 1153916 | 6/1969 | United Kingdom | 298/23 D |
| 1473926 | 5/1977 | United Kingdom | 298/23 DF |

Primary Examiner—Leslie J. Paperner
Attorney, Agent, or Firm—D. K. Sullivan; F. D. AuBuchon

[57] ABSTRACT

In an automatic tailgate of a dump truck a continuous single cable extends from a left side gate lever arm to a right side gate lever arm after passing below the dump body of the truck and being movably secured to the truck frame. When the dump body is in a dumping mode the continuous single cable will allow equalization of tailgate lifting forces.

2 Claims, 5 Drawing Figures

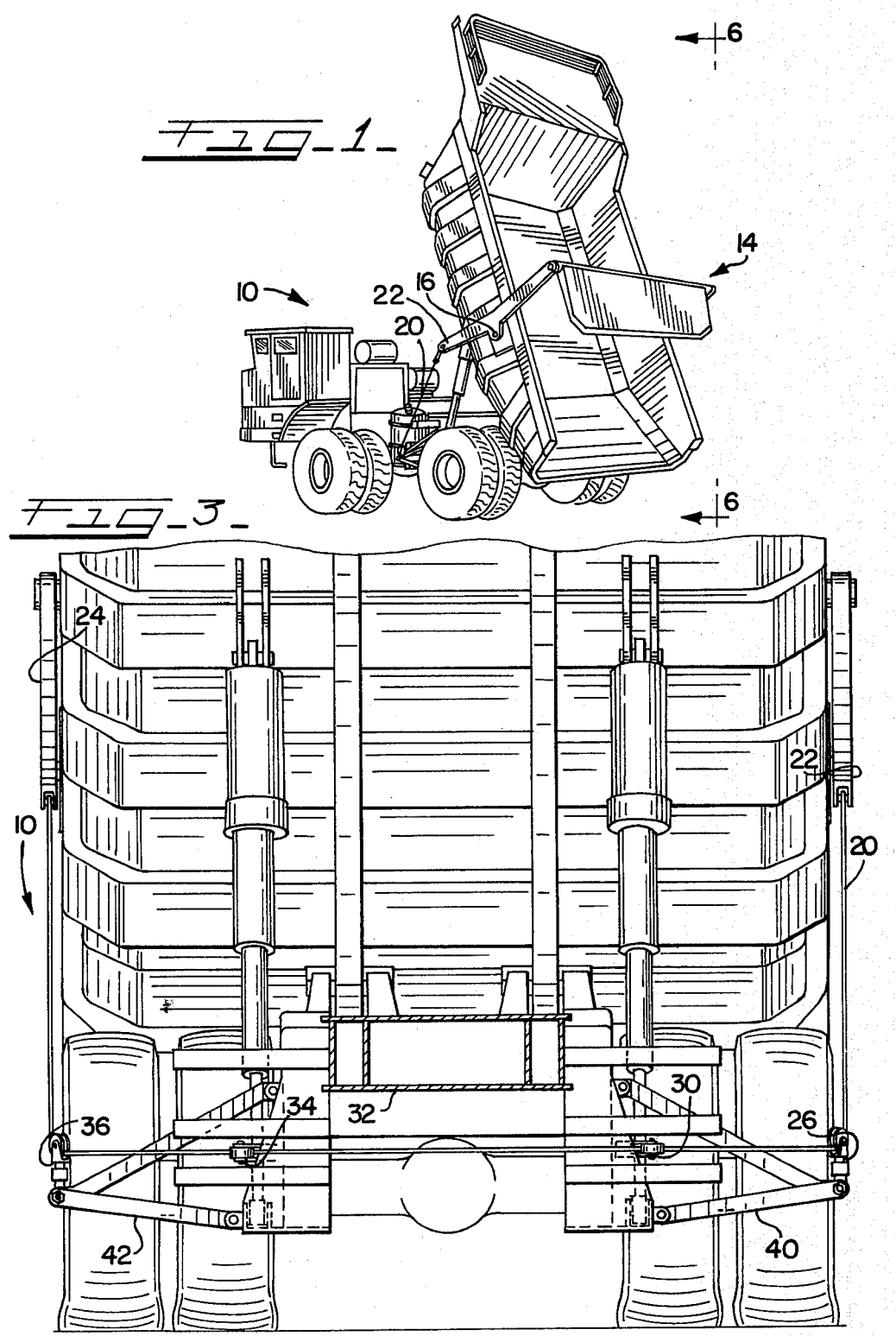

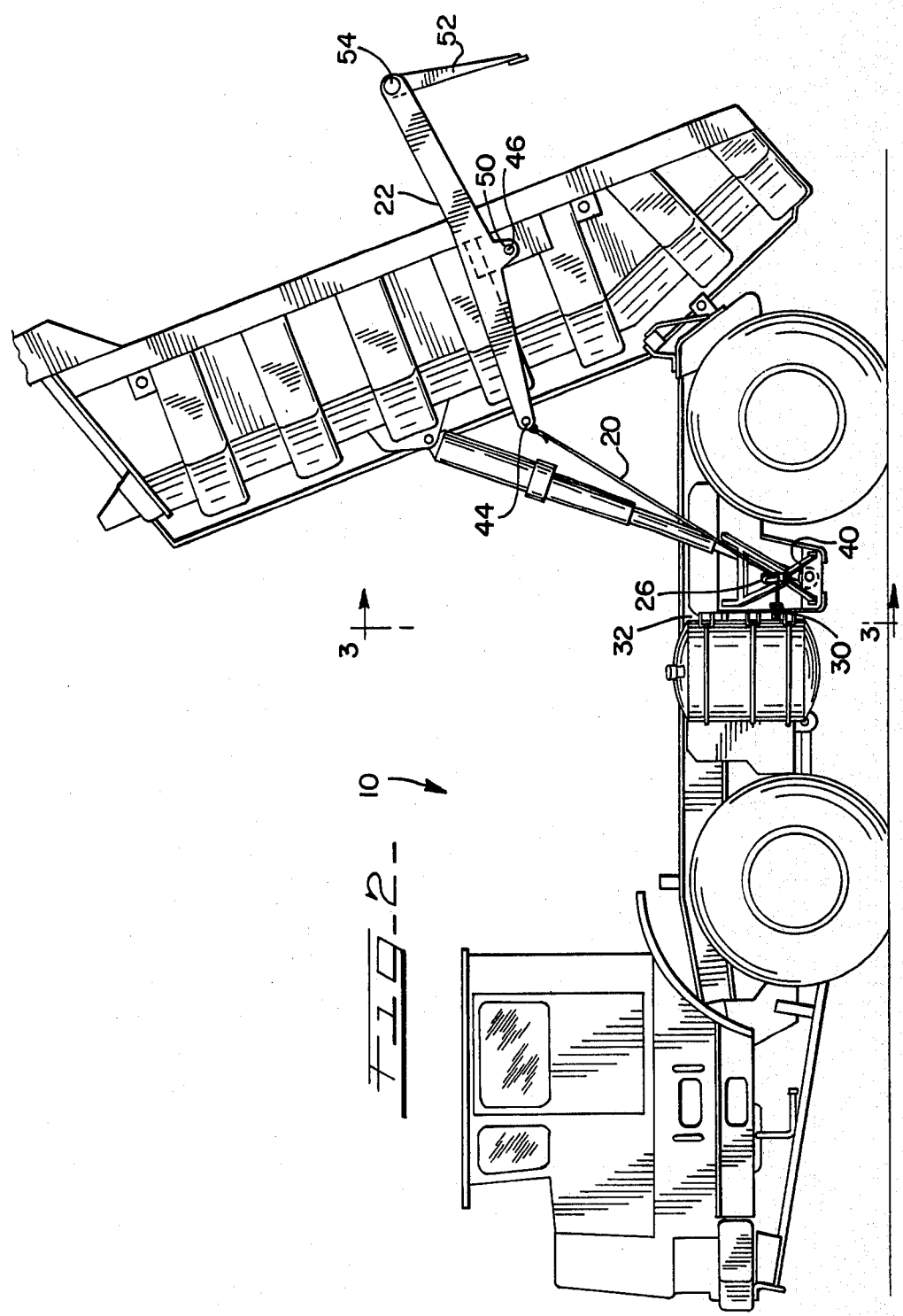

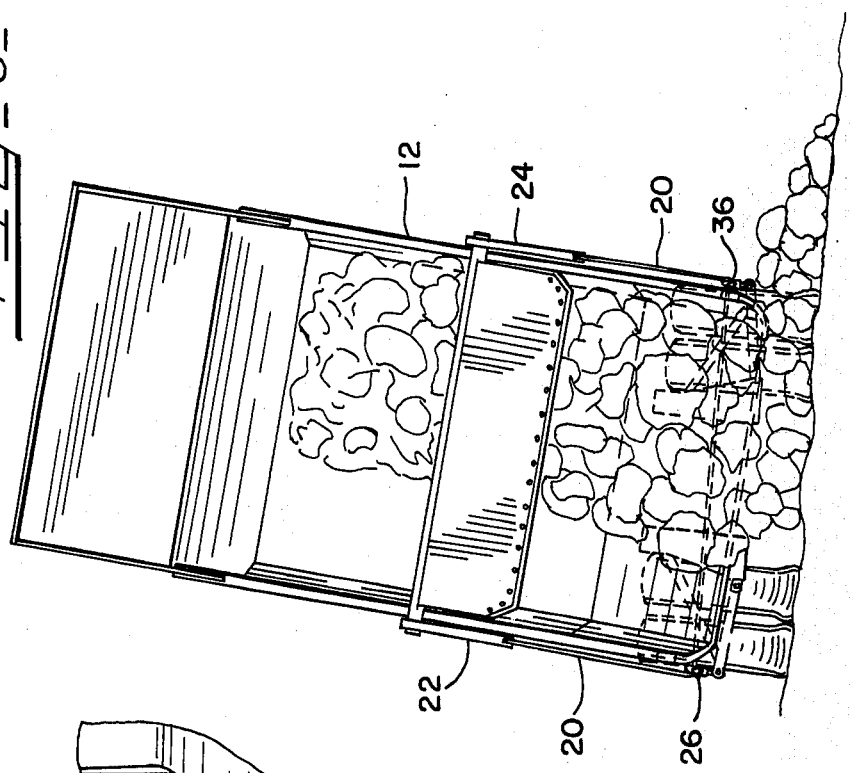
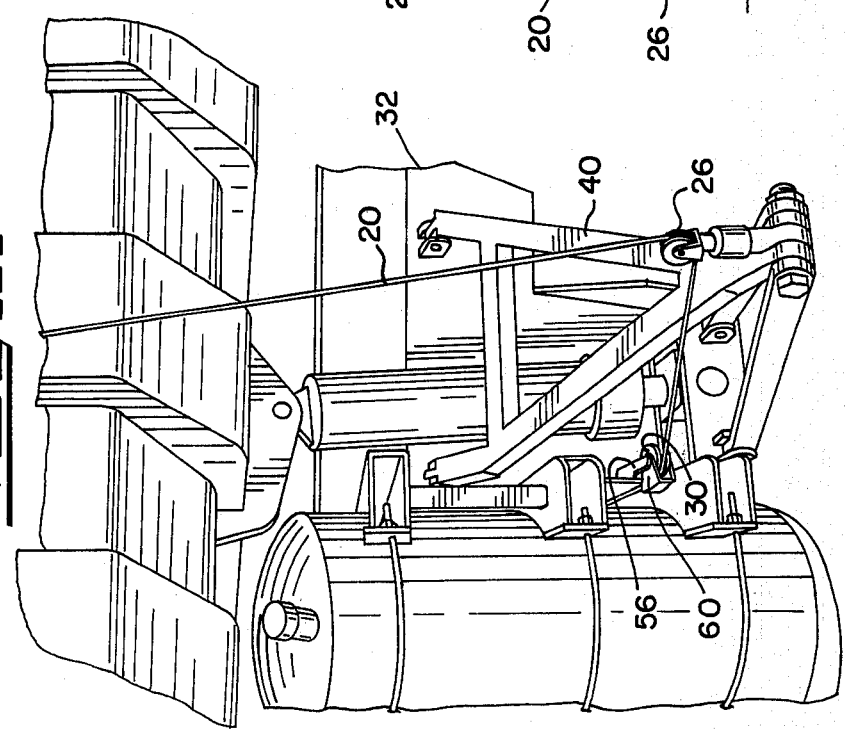

SINGLE CABLE ACTUATED TAILGATE

BACKGROUND OF THE INVENTION

This invention is concerned with automatic tailgates as used on off highway dump trucks. More specifically this invention is concerned with the operating mechanism of an automatic tailgate. It is known in the prior art to use automatic tailgates which are pivotally mounted on the dump body of off highway dump trucks. These tailgates are designed so that they will be lifted out of the way as the dump body is hoisted into a dumping mode. Typically, a linkage system is provided that includes a pair of large levers which are pivotally mounted to the body and support a tailgate between them. Each lever is pivotally attached to a link extending from the lever to a fixed portion, generally the frame, of the vehicle. The most common popular automatic tailgates use a cable or a chain to provide the link between the lever arms and the frame. Each chain is of a fixed length and each cable is fixedly mounted to one side of the vehicle frame. In prior art devices if the dump body is raised while the vehicle is resting on an inclined surface transverse to the fall line the dump body typically will be deflected relative to the frame such that one of the connecting links connecting the lever arm to the frame will be in a relaxed or slack state while the other link on the other side of the vehicle will be in a very taut state and will in actuality be carrying the full weight of the tailgate due to the relative positions of the dump body and the frame.

It is an object of this invention to eliminate unbalanced loading on the tailgate lever arm when the dump truck is being unloaded. This is accomplished by utilizing a single cable extending from the left side lever arm to the right side lever arm after passing below the dump body over at least a single pulley fixing the single cable to the frame of the vehicle. One advantage of the system is that the automatic tailgate, which is typically a three part unit comprised of two outboard lever arms and a tailgate proper, will be subjected to less torsional stress.

Also an advantage of this invention is that the tailgate proper will not bind on the inside of the dump body when unequal forces have tended to torque the body. Another advantage of this invention is that a tighter fitting tailgate can be utilized as the tailgate will have less opportunity to bind in the body.

Furthermore where material in the dump body sticks unevenly to the tailgate the tailgate deflection would be alleviated by a single cable operated tailgate.

Another object of this invention is that a single cable is used thus requiring fewer actual fittings on the cable than would be necessary if a pair of cables were used in its stead as is done in the prior art.

SUMMARY OF THE INVENTION

In an automatic tailgate for use on a dump truck, a tailgate structure including a left side gate lever arm, a right side gate lever arm and a tailgate carried between the two arms is pivotally mounted to a dump body. The tailgate is actuated through the use of a cable link extending from the gate lever arms to the chassis or frame of the vehicle. The cable is a continuous single length of cable that extends basically from one arm to the other arm after passing through guide points, typically pulleys mounted to the frame of the vehicle. This structure allows the flexing of the dump body as it is being dumped to be translated to the tailgate assembly such that the tailgate assembly is not adversely stressed when the dump truck is being unloaded on a side hill incline. Any slack in the single cable is taken up through this system as constant tension is maintained throughout the cable line.

BRIEF DESCRIPTION OF THE DRAWING FIGURES

The objects and advantages of this invention will be apparent to a person having ordinary skill in the art upon the reading of this specification in light of the drawing figures wherein:

FIG. 1 presents a projected view of an off the road dump truck having the dump body in a dumping mode;

FIG. 2 is a side elevation view of the dump truck of FIG. 1;

FIG. 3 is a view of the dump truck of FIG. 2 taken through plane 3—3 with some portions broken away;

FIG. 4 is a detail view of a frame section of the truck shown in FIG. 2; and

FIG. 5 is a rear elevation view of the dump truck of FIG. 2 shown on a side hill incline discharging a load.

DETAILED DESCRIPTION OF THE INVENTION

FIG. 1 shows a projected view of a dump truck generally 10 in a dumping mode showing the dump body 12 hoisted up to allow discharge of the load (not shown). An automatic tailgate generally 14 is pivoted on the body at pivot point 16 so that the tailgate will swing to an open position as the body is raised. The tailgate may be of a conventional type that seals the extreme end of the dump body or of a type disclosed in U.S. patent application Ser. No. 146,976 filed the same day as this application wherein the tailgate fits inside the dump body at a point inboard of the extreme end of the body. The single cable 20 is shown attached to the pivoted gate lever arm 22.

FIGS. 2 and 3 show the single cable 20 clearly in its relationship with the dump truck 10. It can be clearly seen how the single cable 20 extends from the attachment point on the left gate lever arm 22 to the attachment point on the right gate lever arm 24. The cable is threaded through a first swivel pulley 26, a first guide pulley 30, across the center line of the dump truck, here below the frame 32, through a second guide pulley 34, through a second swivel pulley 36 then up to the attaching point on the right gate lever arm 24.

The swivel pulleys 26 and 36 are carried on frame extensions 40 and 42 respectively which are attached to the frame 32 of the vehicle in a location between the axles. Although the frame extensions are provided for in the preferred embodiment shown other embodiments wherein frame extensions or outriggers are not necessary are contemplated by the inventors.

First and second guide pulleys 30 and 34 are attached to the frame 32 in this embodiment but could also be attached to the frame extensions.

FIG. 2 shows the pivoted gate lever arm 22 in elevation with the single cable 20 attached for pivotal movement at point 44. The gate lever arm 22 pivots around pin 46 on attachment point 50. The pivot pins 46 are located high on the sides of the dump body intermediate the forward wall and the open end of the dump body. Tailgate 52 is carried on a transverse beam 54 that extends from pivoted gate lever arm 22 on the left side of the dump body to a mirror image right gate lever arm 24. In the embodiment shown the tailgate fits into the body but is not a limitation of the invention.

FIG. 4 shows details around the left frame extension 40. The single cable 20 goes through the first swivel pulley. The swivel pulleys are of a conventional type that allows the single cable 20 to roll through the pulley, have the cable follow the mounting point 44 on the lever arm 22 as the body is being dumped and also allow the cable to be directed to a guide pulley such as 30. The guide pulleys such as 30 may be carried on a mounting bracket 56 or directly mounted to the frame 32. A conventional slack guard 60 may also be provided.

The single cable 20 will pass transversely across the chassis below the frame through any path necessary to get the cable to the other side. To facilitate this either more or fewer than the four pulleys used in this system could be utilized.

FIG. 5 shows a load being dumped out of the body 12 of the dump truck. The dump body has been tilted rightwardly at an exaggerated angle to show the utility of the invention. The single cable 20 can be seen extending from the left gate lever arm 22 to the first pulley 26, transversely across the truck behind the dump body, to the second swivel pulley 36 and up to the right gate lever arm 24. When the body is raised on unlevel ground as is often the case, the body shifts to the low side causing the cable on that side to become slack and the cable on the up hill side to carry all the load required to lift the gate. This causes unfavorable severe stresses on the gate and lever arm assembly and in the case of a gate made to fit between the body side panels may cause the gate to deflect unnaturally and jam.

The single cable 22 when used on the pulleys as described here eliminates the problems of unequal tension by assuring equal cable tension on both pivoted gate arms. The single cable method can be used to reduce loads on the chassis anchor points by permitting routing of the cable and geometry changes not possible with separate cables.

Thus it can be seen that there has been provided an automatic tailgate utilizing a single continuous length of cable to provide the link between the two pivoted gate arms used to lift the tailgate. The specific embodiment shown is exemplary of the Applicants' invention, some minor modifications would be considered by the Applicants and would still be within the scope and spirit of the appended claims. For instance as stated earlier the number of pulleys for controlling the cable beneath the frame of the vehicle could be increased or decreased. Also it would be possible to replace the cable 20 with a suitable chain. The chain could be made up of a plurality of links for its entire length or could be chain links for portions of the length and regular cable in the pulley areas or other portions of the cable. These alternative embodiments are intended to be within the scope of the following claims.

What is claimed is:

1. In a vehicle having a pivotable rearwardly unloading dump body mounted on the frame of said vehicle and a pivotally mounted tailgate supported between and attached to respective left and right gate lever arms, each gate lever arm having cable attachment points, said gate lever arms carried on pivot pins located high on the sides of the dump body intermediate the forward wall and the open end of said dump body, the improvement comprising:

a single cable attached to said frame in a movable manner and passing below said frame and extending from said cable attachment point of said left gate lever arm to said cable attachment point of said right gate lever arm, said cable being under equal tension throughout its length when said dump body of said vehicle is raised to a dumping mode, said attachment of said cable to said frame in a movable manner including:

a first swivel pulley mounted to the left side of said frame through which said cable is passed;

a first guide pulley mounted to the left side of said frame through which said cable is passed;

a second guide pulley mounted to the right side of said frame through which said cable is passed;

a second swivel pulley mounted to the right side of said frame through which said cable is passed.

2. The invention in accordance with claim 1 wherein said first swivel pulley is mounted vertically below a first one of said pair of pivoted gate lower arms;

said first guide pulley is mounted inboard of said first swivel pulley;

said second guide pulley is mounted inboard of said second swivel pulley;

said second swivel pulley is mounted vertically below a second one of said pair of pivoted gate lever arms.

* * * * *